United States Patent
Mamalis et al.

[15] 3,682,912
[45] Aug. 8, 1972

[54] DI-HYDRO TRIAZINE DERIVATIVES

[72] Inventors: Patrick Mamalis, Reigate; Dennis James Outred, London, both of England

[73] Assignee: Beecham Group Limited, Brentford, Middlesex, England

[22] Filed: Dec. 18, 1969

[21] Appl. No.: 886,343

[52] U.S. Cl.................................260/249.9, 424/249
[51] Int. Cl...........................................G07d 55/20
[58] Field of Search....................................260/249.9

[56] References Cited

UNITED STATES PATENTS

| | | | |
|---|---|---|---|
| 2,976,288 | 3/1961 | Green et al. | 260/249.9 |
| 3,105,074 | 9/1963 | Mamalis | 260/249.9 |

OTHER PUBLICATIONS

Mamalis et al. (I), J. Chem. Soc., pp. 3915– 3926 (1962) QD 1.C6
Mamalis et al. (II), J. Med. Chem., Vol. 8, pp. 684– 91 (1965) RS 1.J5

*Primary Examiner*—John M. Ford
*Attorney*—Jacobs & Jacobs

[57] ABSTRACT

Anti-malarial N-substituted symmetrical dihydrotriazine derivatives and their synthesis are described. A representative compound is 4,6-diamino-1,2-dihydro-2,2-dimethyl-1-[3-(3,4-dichlorophenylpropyloxy)]-1,3,5-triazine. HBr prepared via benzyl benzhydroxamate and benzyloxydiguanide base. The compounds also have other anti-microbial activity.

10 Claims, No Drawings

DI-HYDRO TRIAZINE DERIVATIVES

This invention relates to N-substituted symmetrical di-hydrotriazine derivatives and to processes for making them. Compounds within the scope of the present invention have anti-microbial activity of various kinds, including anti-malarial activity.

Accordingly the present invention provides novel N-substituted symmetrical di-hydrotriazine derivatives

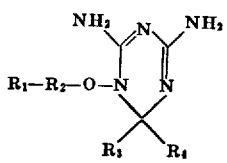

I where $R_1$ is an aromatic ring system, a heterocyclic group or a non-aryl carbocyclic ring system of three to eight carbon atoms, all of which groups may be substituted or unsubstituted;

$R_2$ is a substituted or unsubstituted divalent aliphatic group of two to 16 carbon atoms;

$R_3$ is hydrogen or lower alkyl of one to four carbons, and $R_4$ is a lower alkyl of one to four carbon atoms, where $R_3$ and $R_4$ may be the same or different and may be linked to form a spirocycloalkane or loweralkylspirocycloalkane group including the 2-carbon of the triazine ring and salts and acyl derivatives thereof, except that $R_1$ is not an unsubstituted phenyl group when $R_2$ is unsubstituted and that $R_1$ is not 1-methyl-2-naphthyl when $R_2$ is ethylene.

Within the definition of $R_1$ we wish to include: aryl, including partially hydrogenated aryl and polycyclic aryl, cycloaliphatic, including saturated and unsaturated cycloaliphatic and heterocyclic groups.

$R_1$ may for example be phenyl, naphthyl, phenanthryl, pyrenyl, anthryl, tetrahydronaphthyl and tetrahydrophenyl; cycloalkyl, including cyclopentyl, cyclohexyl, cycloheptyl and methylcyclohexyl; cycloalkenyl, including cyclohexenyl, heterocyclic, including pyridyl, pyrrolidinyl, piperazinyl, imidazolyl, benzimidazolyl, phthalimido, quinolyl, furyl and thienyl.

The group $R_1$ may have a wide range of substituents: it may for example, where the nature of $R_1$ itself is appropriate, be mono- or poly-substituted by aliphatic hydrocarbon groups e.g. aryl and aryloxy;alkyl, including methyl and ethyl;cycloalkyl of three to eight carbon atoms including cyclohexyl, cyclopentyl and cycloheptyl; halogen, including chlorine and bromine; nitro; halogeno-lower alkyl, including mono-, di- and trichloro-, fluoro- or bromo- lower alkyl; lower alkoxy including methoxy, ethoxy and propyloxy; lower alkoxy carbonyl, including methoxycarbonyl, ethoxycarbonyl and propyl-oxycarbonyl; arylloweralkyl, including benzyl and phenylethyl; carboxy; hydroxyl; mercapto; cyano; loweralkylthio, including methylthio and ethylthio; loweralkyl sulphonyl; alkoxysulphonylalkyl; hydroxy-loweralkyl, including 2-hydroxyethyl; loweralkoxy alkyl; cyano-loweralkyl; sulphonamido; amino and mono- and di-loweralkylamino, including methyl- and ethyl- amino. When $R_1$ has more than one substituent these may be the same or different. In general unless otherwise specified these groups may have one to 24 carbon atoms if the prefix "lower" is not used and one to six carbon atoms if the prefix "lower" is used.

Within the definition of $R_2$ we wish to include straight chain or branched divalent aliphatic groups both saturated and unsaturated. $R_2$ may for example be propylene, vinylene, $-(CH_2)_n-$ where $n$ is one to 16, e.g. tetramethylene or 3-methylpropylene.

$R_2$ may be mono- or poly- substituted for example with hydroxy, lower alkoxy of one to six carbon atoms or halogen.

$R_3$ and $R_4$ may for example be methyl, hydrogen and ethyl or may be linked to form a spirocycloalkane group including the 2-carbon atom of the triazine ring for example spirocyclohexane or 4-methylspirocyclohexane.

Although formulae have been used herein in order to represent the compounds of the present invention, the value of the present invention does not depend upon the precise theoretical correctness of these formulae. The names and formulae used herein are not intended to limit the invention to any specific tautomeric form or to any specific optical or geometric isomer.

Structures of the following form may for example contribute towards formula I

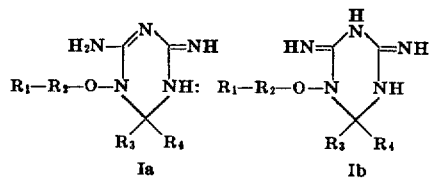

Ia            Ib

The compounds of the present invention are conveniently prepared in the form of acid addition salts, since the free base tends to be somewhat unstable, and a wide range of acids may be used. If the compounds are to be applied pharmaceutically, then the acid should of course have acceptable pharmaceutical properties such as low toxicity.

Thus the compounds of the present invention may be made in the form of the monohydrohalic acid addition salts for example the hydrobromide or the hydrochloride. Other salts may be made however by simple reaction of base with acid and may be desirable in order to modify the properties of the product such as its toxicity, taste, physical form or rate of release into the body. For example the compounds may be made in the form of the picrate, saccharinate, acetate, acid maleate, acid phthalate, succinate, phosphate, p-nitrobenzoate, stearate, mandelate, N-acetyl-glycinate, pamoate, cyclohexyl sulphamate, citrate, tartrate, or gluconate.

Stable salts are normally formed with a ratio of one molecule of triazine to one molecule of mono-basic acid (or more than one molecule of triazine in the case of polybasic acids) but the possibility of having basic groups as X or as substituents in $R_1$ for example means that further quantities of acid may be combined with the triazine in some cases.

The presence of the amino groups on the triazine ring of formula I creates the possibility of forming acyl derivatives by reaction with acylating agents such as acyl halides, anhydrides and acyl azides. One to four acetyl groups for example may be associated with the compound of formula I although in some cases it may be more difficult to make derivatives having higher numbers of acetyl groups. The present invention therefore includes compounds of formula I in the form of acyl derivatives (for example loweraliphatic acyl, such as acetyl derivatives or benzoyl).

In certain preferred compounds of the present invention $R_1$ is phenyl or naphthyl substituted by one or more halogen atoms, especially chlorine. Preferably also $R_2$ is a saturated aliphatic group containing two to eight carbon atoms and $R_3$ and $R_4$ are both methyl.

Compounds within the scope of the present invention have activity against bacteria, protazoa, parasites, including the Plasmodia of malaria, fungi including dermatophytes and Candida, and also display coccidiostatic properties in certain cases.

Thus activity has been observed against *Staph. aureus*, *Escherichia coli*, *Candida albicans*, *Proteus mirabilis*, *Pseudomonas pyocyanea* and *Streptococcus haemolyticus*.

For example 4,6-diamino-1,2-dihydro-2,2-dimethyl-1-[3'-(3,4-dichlorophenylpropyloxy)]-1,3,5-triazine hydrobromide of the formula

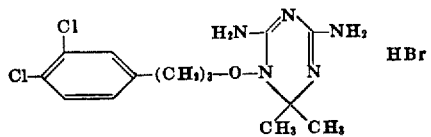

displays activity against cycloguanil-sensitive and cycloguanil-resistant strains of *Plasmodium berghei* in the mouse.

The present invention also provides a process for the preparation of the compounds of the present invention which comprises reacting a triazine of the formula

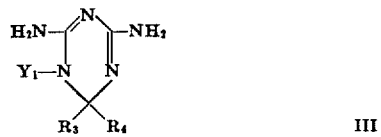

III where $Y_1$ is a reactive group with a compound $R_5Y_2$ which is capable of reacting with $Y_1$ so as to form the group $R_1R_2O-$ or an intermediate group capable of conversion thereto and where necessary converting the intermediate group to $R_1R_2O-$ and optionally where necessary forming a salt.

Preferably $Y_1$ and $Y_2$ are OH or derivatives of OH capable of reacting with each other to form an oxygen linkage. Thus $Y_1$ and $Y_2$ should have at least one oxygen atom between them. Conveniently $Y_1$ is OH (see formula VI) or OM where M is a metal for example sodium, potassium or lithium and $Y_2$ is chlorine, bromine or iodine. Other reactive derivatives of the OH group include sulphonic acid derivatives.

In a preferred process a compound $R_1R_2Z$ where Z is chlorine or bromine is reacted with the hydroxy triazine $V^1$ in an inert solvent or diluent. Examples of suitable solvents include dimethyl sulphoxide, dimethylformamide or ethanol.

The hydroxy triazine derivative VI is usually obtained in the form of an acid addition salt (e.g. the hydrochloride) from which the free base may be liberated by one equivalent of base such as an alkali metal hydroxide (e.g. potassium hydroxide) or sodium in ethanol or methanol. The mixture may then be evaporated and reacted in a suitable solvent (e.g. dimethylformamide or dimethylsulphoxide). Preferably extra base is not added, since with two equivalents of sodium in alcohol for example a less pure product is obtained.

In a modified procedure, usually giving poorer yields, the hydrochloride of compound VI in dimethyl-formamide or dimethylsulphoxide is reacted with one equivalent of aqueous potassium hydroxide (using as little water as possible) and the resulting mixture reacted to give a triazine hydrohalide.

The $Y_1$ N-substituted triazine III may be made from an appropriately substituted diguanide as outlined hereinafter or by any other convenient method.

The side-chain $R_1R_2$ O may be attached in a variety of ways and may be attached in one reaction or in fragments. Normally the minimum number of stages is employed to achieve optimum yields, for convenience and other factors.

Thus well-known ether-forming synthetic methods may be used to link the side-chain to the triazine with the O atom previously in place on either the side-chain or the triazine. Typical examples are 1. the reaction of a halide with a hydroxyl compound with or without added base as previously described.
2. the reaction of a reactive ester such as a sulphonate with a hydroxyl compound.

In another process a compound of the general formula

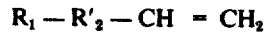

may be reacted with the hydroxy triazine VI where $R'_2$ is the same as $R_2$ in formula I but minus two carbon atoms. Alternatively compounds within the scope of the present invention may be made by reacting the hydroxytriazine VI with formaldehyde in the presence of hydrochloric acid to form a compound of formula

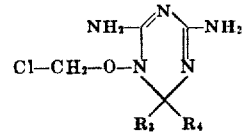

and reacting this with a compound of formula

where $R''_2$ is the same as $R_2$ in formula I minus one carbon atom, to form compounds of the general formula

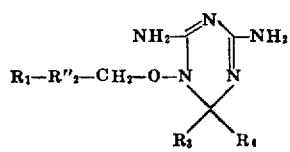

Alternatively certain hydroxy substituted compounds within the scope of the present invention may be made by reacting an appropriately substituted ethylene oxide with the hydroxy triazine VI as illustrated by the reaction scheme

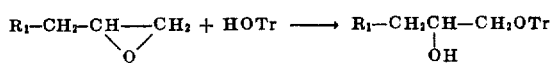

where Tr is used to represent

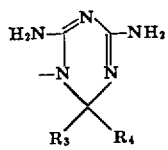

Reactions of the types illustrated above may clearly be performed using either the hydroxytriazine VI as a starting material or a triazine with a partial side-chain already in place although in many cases such a partial side-chain triazine may be made from the hydroxytriazine originally.

A further aspect of the present invention provides a process for the preparation of the compounds of the present invention which comprises reacting a substituted diguanide of the formula

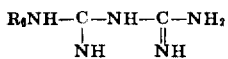     IV where $R_6$ is $R_1$—$R_2$—O— or a group capable of conversion thereto with a carbonyl compound

in the presence of an acid catalyst to form a substituted triazine of formula V

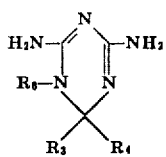     V and converting $R_6$ where necessary into $R_1$—$R_2$—O— and optionally where necessary forming a salt.

Preferably the acid is a strong acid such as hydrochloric or formic acid and at least one molecular equivalent is used. The reaction may in some cases be carried out without any further solvents or diluents but usually an inert solvent such as a lower aliphatic alcohol (e.g. methanol) is preferred.

When $R_6$ is $R_1$—$R_2$—O— the substituted diguanide II becomes

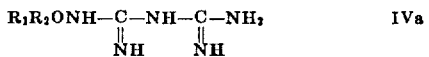     IVa and accordingly the present invention also provides compounds of this kind for use as intermediates in the process of the present invention. Compound IVa may be made for example by reacting a bromide of the general formula $R_1$ $R_2$ Br with benzhydroxamic acid and treating this with acid to form an oxyamine of formula $R_1$ $R_2$ O $NH_2$ which is subsequently reacted with dicyandiamide.

Alternatively the group $R_6$ may be chosen so as to be convertible into the group $R_1$ $R_2$ O. For example $R_6$ may be a group which is capable of undergoing catalytic hydrogenolysis. Thus an $R_6$N— substituted triazine may be formed from an appropriately substituted diguanide and then hydrogenolyzed to produce the hydroxy triazine VI

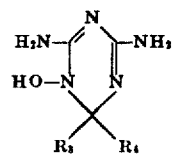     VI $R_6$ may for example be substituted or unsubstituted benzyl or substituted or unsubstituted naphthylmethyl and the hydrogenolysis may be carried out with hydrogen in the presence of a palladium catalyst.

The hydroxytriazine VI may then be reacted in a variety of ways well understood by those skilled in the art and as indicated previously to produce the desired substituted triazine of formula I.

It will be further understood by those skilled in the art that the side-chain $R_1$ $R_2$ O may be built up or attached in stages either before or after the substituted diguanide IV is converted to the substituted triazine V.

The final product may be obtained in the form of an acid addition salt as a consequence of the reaction without the necessity of a separate step of salt formation but if necessary the additional step of reacting the free base with an acid to form a salt may be performed. Salts can be converted back to the free base by treatment with alkali (e.g. KOH) and then converted to other salts as required by conventional means.

Acyl derivatives may also be made by reacting the base with acyl derivatives as previously described.

The present invention also provides pharmaceutical compositions for use against malaria comprising as active ingredient a compound according to the present invention together with a pharmaceutically acceptable carrier.

Thus the active compounds of this invention are effective against Plasmodia Therefore, one aspect of the present invention is a method of treatment or prevention of malaria in which one of the active compounds may be administered orally, parenterally, or by suppository, through the oral route is preferred.

As stated above the compound of this invention may be administered orally, parenterally or by suppository. The water solubility of the hydrochloride of the compound and most other slats is low and the hydrochloride is non-hygroscopic. If solutions are required it will be necessary to add solubilizing agents to the water, choose non-aqueous solvents, find a more soluble salt or prepare very dilute solutions.

Oral formulations are preferred and with the above proviso in connection with solutions, typical oral formulations will include tablets, pills, capsules, sachets, granules, powders, chewing gum, suspensions, emulsions and solutions: particularly preferred oral formulations are tablets and capsules. Where appropriate and where necessary the formulations may include diluents, binding agents, dispersing agents, surface-active agents, lubricating agents, coating materials, flavoring agents, coloring agents, solvents, thickening agents, suspending agents, sweeteners or any other pharmaceutically acceptable additives, for example gelatin, lactose, starch, talc, magnesium stearate, hydrogenated oils, polyglycols and syrups. Where the formulations are tablets or capsules and the like they will represent pre-measured unit dose but in the case of granules, powders, suspensions and the like the formulations may be presented as premeasured unit doses or in multi-dose containers from which the appropriate unit dose may be withdrawn.

The injectable form may be an aqueous or non-aqueous solution, suspension, or emulsion in a pharmaceutically acceptable liquid (e.g. sterile pyrogen-free water or parenterally acceptable oils) or mixture of liquids which may contain bacterio-static agents, antioxidants or other preservatives, buffers, (preferably in the physiological pH range of 6.5 – 7.0), solutes to render the solution isotonic with the blood, thickening agents, suspending agents or other pharmaceutically acceptable additives. Such forms will be presented in unit dose form such as ampoules or disposable injection devices or in multi-dose forms such as a bottle from which the appropriate dose may be withdrawn, or as a solid form or concentrate which can be used to quickly prepare an injectable formulation. All formulations for injection are preferably rendered sterile. Suppositories containing the compound will also contain suitable carriers (e.g. cocoa butter or polyglycols).

In addition to standard pharmaceutical additives there may be included within formulations of the compound other therapeutic agents, particularly including other antimalarials (e.g. sulphonamides).

Insofar as the formulations of the present invention are novel this invention also provides a method of producing them.

Examples of the invention will now be described:

EXAMPLE 1

4,6-diamino-1,2-dihydro-2,2-dimethyl-1-[3-(3,4-dichlorophenylpropyloxy)]-1,3,5-triazine hydrobromide Benzhydroxamic acid (137 g. 1.0 mol.) and I.M.S. (a mixture of ethanol with a few percent methanol) (1.5 liters) are placed in a flask equipped with a stirrer, dropping funnel and condenser, and stirred until solution is complete. A solution of NaOH (40 g., 1.0 mol.) in water (100 ml.) is added with vigorous stirring. The sodium salt of benzhydroxamic acid may precipitate at this stage.

Benzyl bromide (170 g., 120 ml.) is added dropwise over 45 minutes, the mixture gradually becomes clear, leaving only a small amount of inorganic material undissolved. The reaction is preferably left at room temperature for 3 days, refluxing for one to two hours will give slightly lower yields.

The solvent is removed under reduced pressure and the oily residue is dissolved in ethyl acetate and washed several times with water. The solvent extract is dried with magnesium sulphate, filtered and evaporated to dryness under vacuum.

The solid residue is triturated with ether and collected to give the required benzyl benzhydroxamate ($C_6H_5CONHOCH_2C_6H_5$) m.p. 100° – 102° C.

The benzyl benzhydroxamate (170 g.) is dissolved in methanol (500 ml.) and concentrated hydrochloric acid (165 ml.) is added. The mixture is refluxed for 3 hours, filtered hot, and allowed to crystallize. The solid collected by filtration is washed well with ether, until no smell of methyl benzoate remains. Yield of amino-oxymethylbenzene hydrochloride:

First crop 120 g. m.p. 227° – 230° (sealed tube) Concentration of the mother liquors and treatment with ether gives a further crop, 20 g. m.p. 220°–225° (sealed tube).

Total yield = 140 g. (ca. 90 percent)

Amino-oxymethyl benzene hydrochloride (97.5 g.) and dicyandiamide (51.4 g.) are dissolved in I.M.S. (300 ml.) with stirring and warming. The mixture is then refluxed for 3 hours, filtered if necessary, and evaporated under reduced pressure. The oily residue is dissolved in water and treated with strong aqueous NaOH (ca. 6N) with stirring. The diguanide base which separates, solidifies on cooling and is collected, washed with water and dried.

The yield of benzyloxy diguanide base is 95 – 100 g. m.p. 98° – 100° (80 percent).

Benzyloxydiguanide base (52 g.) is dissolved in I.M.S. (200 ml.) and concentrated hydrochloric acid (43 ml.) is added, followed by acetone (200 ml.). Preferably, the reaction is left at room temperature for 3 days but a 2 – 3 hour reflux period will give slightly lower yields. Some triazine usually separates, and may be collected by filtration, washed with water and dried.

The mother liquors are evaporated to dryness and the residue triturated with acetone, to give a white solid. The solid is collected washed with water and dried.

Total yield of 4,6-diamino-1,2-dihydro-2,2-dimethyl-1-benzyloxy-1,3,5-triazine hydrochloride 61 g. m.p. 204° – 206° (80 percent).

41 parts of 4,6-diamino-1,2-dihydro-2,2-dimethyl-1-benzyloxy-1,3,5-triazine hydrochloride dissolved in 320 parts of ethanol and 220 parts of water was shaken with hydrogen and 0.25 to 1.0 parts of 10 percent palladised charcoal catalyst, that is a catalyst composed of acid washed active charcoal (90 parts) on which has been adsorbed 10 parts by weight of metallic palladium in a finely divided form, at room temperature and atmospheric pressure until the uptake of hydrogen ceased. The catalyst was filtered off and the filtrate evaporated to dryness to give 4,6-diamino-1,2-dihydro-2,2-dimethyl-1-hydroxy-1,3,5-triazine hydrochloride (24.5 parts), m.p. 234° – 235° C (decomp.).

Crystallization from ethanol gave needles, m.p. 237° C (decomp.). The reduction described in this Example may be effected using a platinum catalyst as described below:

11 Parts of 4,6-diamino-1,2-dihydro-2,2-dimethyl-1-benzyloxy-1,3,5-triazine hydrochloride dissolved in 200 parts methanol and 100 parts water were shaken with hydrogen and platinic oxide at room temperature and atmospheric pressure until a 10 percent excess over the theoretically calculated hydrogen uptake was observed. Hydrogenation was stopped, the catalyst removed and the clear filtrate evaporated to dryness at reduced pressure. The solid residue was triturated with acetone and the 4,6-diamino-1,2-dihydro-2,2-dimethyl-1- hydroxyl-1,3,5-triazine hydrochloride collected in theoretical yield, m.p. 234° (decomp.).

4,6-Diamino-1,2-dihydro-2,2-dimethyl-1-hydroxy-1,3,5-triazine hydrochloride (1.93 g.) dissolved in methanol (25 ml.) was treated with a solution of KOH (0.7 g.) in methanol (15 ml.). The mixture was refluxed for 20 minutes and the solvent removed at reduced pressure. The residue was suspended in dimethylformamide, and treated with 3-(3,4-dichlorophenyl)propyl bromide (3.0 g.). The mixture was stirred at room temperature for one hour, and then gently warmed until a clear solution was obtained. The solution was filtered, and evaporated to dryness, the residue was triturated with acetone, and the white solid collected, (3.2 g.) m.p. 190 – 193. This material was washed with water and recrystallized from ethanol to give the pure triazine (1.7 g.) m.p. 203° C, 4,6-diamino-1,2-dihydro-2,2-dimethyl-1-[3;(3,4-dichlorophenylpropyloxy)]-1,3,5-triazine hydrobromide.

EXAMPLE 2

4,6-Diamino-1,2-dihydro-2,2-dimethyl-1-(6-cyclohexyl)hexyloxy)-1,3,5-triazine hydrobromide 6-(Cyclohexyl)-hexyl bromide was prepared by the treatment of 6-(cyclohexyl)-hexan-1-ol with a mixture of HBr (48 percent) and $H_2SO_4$ (28:3 parts by volume). The mixture was refluxed for 6 hours, diluted with water, and extracted with ether. The extract was washed with water, dilute $NaHCO_3$ solution and water, dried over $MgSO_4$. After filtration and removal of the solvent, the oily residue was distilled at 1 mm. pressure. The fraction boiling at 112° – 114° C was the required bromide $n_D^{23}$ 1.4840.

The above bromide (7.5 g.) was reacted with the base derived from 4,6-diamino-1,2-dihydro-2,2-dimethyl-1-hydroxy-1,3,5-triazine hydrochloride (5.8 g.) and KOH (2.1 g.) as described above. The reaction was heated with stirring at 90° – 100° for six hours. After working up in the previously described manner, the required triazine was obtained (5.0 g.) m.p. 203°C, 4,6-diamino-1,2-dihydro-2,2-dimethyl-1-(6-(cyclohexyl)hexyloxy)-1,3,5-triazine hydrobromide.

EXAMPLES 3 – 41

The following compounds were made by a process closely similar to that described in Example 2. Symbols have the meanings ascribed to them in formula I.

| ex. no. | $R_1$ | $R_2$ | $R_3$ | $R_4$ | Salt | m.p.°C |
|---|---|---|---|---|---|---|
| 3 | 3,4—$Cl_2C_6H_3$ | $(CH_2)_2$ | $CH_3$ | $CH_3$ | HBr | 216 |
| 4 | 3,4—$Cl_2C_6H_3$ | $(CH_2)_3$ | $CH_3$ | $CH_3$ | HBr | 203 |
| 5 | 4—$ClC_6H_4$ | $(CH_2)_2$ CHCl | $CH_3$ | $CH_3$ | HBr | 210 |
| 6 | $C_6H_5$ | .CHCl.$CH_2$ | $CH_3$ | $CH_3$ | HBr | 187 |
| 7 | 4—$NO_2C_6H_4$ | $(CH_2)_3$ | $CH_3$ | $CH_3$ | HCl | 206 |
| 8 | N-Pyrrolidyl | $CH(CH_3)CH_2$ | $CH_3$ | $CH_3$ | HCl | 183–185 |
| 9 | N'-Methyl-N-piperazinyl | $CH(CH_3)CH_2$ | $CH_3$ | $CH_3$ | HCl | 153–155 |
| 10 | 4—Cl $C_6H_4$ | $(CH_2)_3$ | $CH_3$ | $CH_3$ | HBr | 190–192 |
| 11 | Cyclohexyl | $(CH_2)_6$ | $CH_3$ | $CH_3$ | HBr | 203 |
| 12 | Cyclohexyl | $(CH_2)_6$ | -$(CH_2)_5$- | | HBr | 225–226 |
| 13 | 3,4—$Cl_2C_6H_3$ | $(CH_2)_4$ | $CH_3$ | $CH_3$ | HBr | 225 |
| 14 | 2-$CH_3$-5-$NO_2$-1-imidazolyl | $(CH_2)_2$ | $CH_3$ | $CH_3$ | HCl | 193 |
| 15 | 4-Pyridyl | $(CH_2)_3$ | $CH_3$ | $CH_3$ | HBr | 200 |
| 16 | Cyclohexyl | $(CH_2)_3$ | $CH_3$ | $CH_3$ | HBr | 186 |
| 17 | Cyclohexyl | $(CH_2)_3$ | —$(CH_2)_5$— | | HBr | 242 |
| 18 | 2,6—$Cl_2C_6H_3$ | $CH(CH_3)$ | $CH_3$ | $CH_3$ | HBr | 216 |
| 19 | 2,4—$Cl_2C_6H_3$ | $CH(CH_3)$ | $CH_3$ | $CH_3$ | HBr | 201 |
| 20 | 3,4—$Cl_2C_6H_3$ | $CH(CH_3)$ | $CH_3$ | $CH_3$ | HBr | 214–216 |
| 21 | 3,4-$Cl_2C_6H_3$ | $CH(C_2H_5)$ | $CH_3$ | $CH_3$ | HBr | 209–210 |
| 22 | 2,4-$Cl_2C_6H_3$ | $CH(C_2H_5)$ | $CH_3$ | $CH_3$ | HBr | 201–202 |
| 23 | 2,6-$Cl_2C_6H_3$ | $CH(C_2H_5)$ | $CH_3$ | $CH_3$ | HBr | 185–187 |
| 24 | 2,4-$Cl_2C_6H_3$ | $CH(C_2H_5)$ | H | $C_2H_5$ | HBr | 188–190 |
| 25 | 2,6-$Cl_2C_6H_3$ | $CH(C_2H_5)$ | H | $C_2H_5$ | HBr | 185–187 |
| 26 | 3,4-$Cl_2C_6H_3$ | $CH(CH_3)$ | H | $C_2H_5$ | HBr | 213–215 |
| 27 | 2,4-$Cl_2C_6H_3$ | $CH(CH_3)$ | H | $CH_3$ | HBr | 225–227 |
| 28 | 3,4-$Cl_2C_6H_3$ | $CH(CH_3)$ | H | $CH_3$ | HBr | 225–227 |
| 29 | 2,4-$Cl_2C_6H_3$ | $CH(CH_3)$ | H | $C_2H_5$ | HBr | 188–190 |
| 30 | 2,6-$Cl_2C_6H_3$ | $CH(CH_3)$ | H | $C_2H_5$ | HBr | 217–219 |
| 31 | 2-Benzimidazolyl | $(CH_2)_3$ | $CH_3$ | $CH_3$ | 2. HBr 1. $H_2O$ | 246–247 |
| 32 | 3,5-$(CH_3)_2$-Phenyl | $(CH_2)_3$ | $CH_3$ | $CH_3$ | HBr | 233–235 |
| 33 | 4-$NH_2$-Phenyl | $(CH_2)_3$ | $CH_3$ | $CH_3$ | HBr | 215 |
| 34 | N-Phthalimido | $(CH_2)_3$ | $CH_3$ | $CH_3$ | HBr | 201–203 |
| 35 | N-1,2,3,4-Tetrahydroisoquinoline | $(CH_2)_2$ | $CH_3$ | $CH_3$ | 2. HBr | ca 100 |
| 36 | cycloHexyl | $(CH_2)_4$ | $CH_3$ | $CH_3$ | HBr | 196–198 |
| 37 | 3-$CF_3$Phenyl | $(CH_2)_3$ | $CH_3$ | $CH_3$ | HBr | 185 |
| 38 | 1-Naphthyl | $(CH_2)_3$ | $CH_3$ | $CH_3$ | HBr | 220–222 |
| 39 | 3,4-$Cl_2$Phenyl | $CH=CH-CH_2$ | $CH_3CH_3$ | | HBr | 209 |
| 40 | 1-Cl-2-naphthyl | $(CH_2)_3$ | $CH_3$ | $CH_3$ | HBr | 194–196 |
| 41 | 2,4-$Cl_2$-phenyl | $CH=CH-CH_2$ | $CH_3CH_3$ | | HBr | 190–191 |

EXAMPLE 42

4,6-Diamino-1,2-dihydro-2,2-dimethyl-1-[3,(3,4-dichlorophenylpropyloxy)]-1,3,5-triazine hydrochloride Benzhydroxamic acid (13.7 g.) was dissolved in methanol (100 ml.) and a solution of NaOH (4.0 g.) in 10 ml. of water was added. 3-(3,4-dichloro-phenyl)propyloxy bromide (26.8 g.) was added dropwise with stirring. When the addition was complete the mixture was refluxed for three hours, the solvent evaporated and the residue dissolved in water and extracted with ethyl acetate. The solvent extract was washed with water, dried and evaporated to yield a pale yellow viscous oil which slowly crystallized. The required benzhydroxamate was obtained by trituration with ether and filtration to give a white solid which could be crystallized from ethanol to yield the pure compound.

3-(3,4-dichlorophenyl)propyl benzhydroxamate (16.2 g.) was refluxed with a mixture of methanol (120 ml.) and concentrated hydrochloric acid (40 ml.) for two hours. The reaction mixture was filtered and evaporated under reduced pressure and the residue was triturated with either, filtered and washed well with ether to yield 3-(3,4-dichlorophenyl)propyloxyamine hydrochloride. This compound (12.8 g.) and dicyandiamide (6.3 g.) were dissolved in ethanol (100 ml.) and refluxed for three hours. The reaction mixture was evaporated to dryness under reduced pressure and the residual gum was dissolved in water and basified with 4N NaOH solution: an oil separated which slowly solidified. The solid was collected by filtration, washed well with water and dried in a vacuum desiccator. The 3-(3,4-dichlorophenyl)propyloxy diguanide thus obtained was a cream colored solid which darkened on prolonged exposure to light. The crude material could be recrystallized from ethyl acetate/petrol to yield the pure compound.

15.2 g. of the pure compound was dissolved in methanol (50 ml.) and 8.6 ml. of concentrated hydrochloric acid was added followed by 50 ml. of acetone and the mixture refluxed for 3 hours. The reaction mixture was filtered and evaporated to dryness under reduced pressure, the residue was triturated with acetone and filtered. The white solid obtained was washed well with water, dried and recrystallized from ethanol to yield 4,6-diamino-1,2-dihydro-2,2-dimethyl-1-[3,(3,4-dichlorophenylpropyloxy)]-1,3,5-triazine hydro-chloride, m.p. 235° – 237° C (decomp.).

EXAMPLE 43

Acyl derivatives of 4,6-diamino-1,2-dihydro-2,2-dimethyl-1-[3-(3,4-dichlorophenylpropyloxy)]-1,3,5-triazine a. Diacetyl derivative The triazine of the title (1.0 g.) and redistilled acetic anhydride (10 ml.) were heated on a steam bath for 5 minutes. Excess acetic anhydride was removed by evaporation and the residue dissolved in ethyl acetate. 40° – 60° C petrol was added, followed by crystallization under cool conditions to give a yield of 0.5 g., m.p. 125°C.

The melting point remained constant on recrystallization (ethyl acetate/petrol 40° – 60°C).

b. Tetraacetyl derivative

The triazine (1.0 g.), triethylamine (5 ml.) and redistilled acetic anhydride (10 ml.) were stirred at room temperature for 70 hours. The reaction mixture was poured onto ice and stirred for 1 hour followed by extraction with ethyl acetate. Extracts were washed with water, dried over $MgSO_4$, charcoaled and solvent removed by evaporation. The residue was recrystallized from ethyl acetate/petrol 40° – 60°C.

Yield = 0.4 g., m.p. 84°C.

On recrystallization (ethyl acetate/petrol 40° – 60° C) m.p. = 85°C.

c. Di-benzamide

The triazine (2.0 g.) and benzoic anhydride (10 g.) were heated in a steam bath for 30 minutes. The reaction mixture was cooled and triturated with ether to give a white solid, m.p. 128° – 130°C.

What is claimed is:

1. A compound selected from the group consisting of
   a. a dihydrotriazine of the formula:

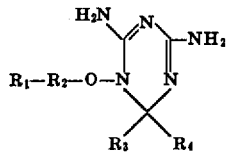

wherein
$R_1$ is an unsubstituted or substituted member selected from the group consisting of phenyl, naphthyl, cycloalkyl of three to eight carbon atoms, pyridyl, pyrrolidinyl, piperazinyl, imidazolyl, benzimidazolyl, phthalimido, quinolyl, furyl and thienyl, in which when said members are substituted the substituents are selected from the group consisting of halogeno, nitro, trifluoromethyl, lower alkyl and lower alkoxy;

$R_2$ is an aliphatic chain of from two to 16 carbon atoms selected from the group consisting of alkylene, alkenylene and chloro-substituted alkylene, provided
i. $R_2$ is other than alkylene when $R_1$ is unsubstituted phenyl and
ii. $R_2$ is other than ethylene when $R_1$ is 1-methylnaphth-2-yl;

$R_3$ when taken independently of $R_4$ is hydrogen or alkyl of one to four carbon atoms, and $R_4$ when taken independently of R is alkyl of one to four carbon atoms, or $R_3$ and $R_4$, together with the carbon atom to which they are attached, form a spirocycloalkane or lower alkylspirocycloalkane group;

b. the non-toxic N-lower alkanoyl and N-benzoyl derivatives thereof; and c. the non-toxic acid addition salts thereof.

2. A compound according to claim 1 wherein $R_1$ is unsubstituted or substituted phenyl or naphthyl.

3. A compound according to claim 2 wherein $R_1$ is phenyl or naphthyl substituted by at least one halogen atom.

4. A compound according to claim 3 wherein the halogen is chlorine.

5. A compound according to claim 1 wherein $R_2$ is alkylene.

6. A compound according to claim 5 wherein $R_2$ is straight chain alkylene of two to eight carbon atoms.

7. A compound according to claim 1 wherein each of $R_3$ and $R_4$ is methyl.

8. A compound according to claim 1 wherein $R_1$ is substituted phenyl, naphthyl or substituted naphthyl wherein the substituent is chloro, nitro, trifluoromethyl or methyl, $R_2$ is alkylene of two to eight carbon atoms and each of $R_3$ and $R_4$ is methyl.

9. A compound according to claim 1 wherein $R_1$ is 3,4-dichlorophenyl, $R_2$ is trimethylene and each of $R_3$ and $R_4$ is methyl.

10. 4,6-diamino-1,2-dihydro-2,2-dimethyl-1-[3-(3,4-dichlorophenylpropyloxy)]g1,3,5-triazine hydrobromide.

* * * * *